US007533343B2

(12) United States Patent
Ratnakar

(10) Patent No.: US 7,533,343 B2
(45) Date of Patent: May 12, 2009

(54) WEB PAGE TO CELLULAR PHONE—CONTACT INFORMATION MESSAGING SYSTEM

(75) Inventor: Nitesh Ratnakar, Oak Creek, WI (US)

(73) Assignee: Novation Science Holding, LLC, Elkins, WV (US)

( * ) Notice: Subject to any disclaimer, the term of this patent is extended or adjusted under 35 U.S.C. 154(b) by 258 days.

(21) Appl. No.: 11/306,336

(22) Filed: Dec. 23, 2005

(65) Prior Publication Data

US 2007/0168418 A1      Jul. 19, 2007

(51) Int. Cl.
     *G06F 3/00*     (2006.01)
(52) U.S. Cl. ...................... 715/733; 715/748
(58) Field of Classification Search ................ None
     See application file for complete search history.

(56) References Cited

U.S. PATENT DOCUMENTS

| | | | | |
|---|---|---|---|---|
| 6,973,299 | B2* | 12/2005 | Apfel | 455/412.2 |
| 7,193,620 | B2* | 3/2007 | Nguyen et al. | 345/204 |
| 7,245,634 | B2* | 7/2007 | Yen | 370/468 |
| 2001/0011275 | A1* | 8/2001 | Lin et al. | 707/9 |
| 2002/0101446 | A1* | 8/2002 | Tang et al. | 345/751 |
| 2005/0213763 | A1* | 9/2005 | Owen et al. | 380/270 |

OTHER PUBLICATIONS

Microsoft Internet Explorer version 6.0; Copyright Date: 2004.*
Sprint. "Palm Centrino Smart Device." User's Guide Template Version 5B. Copyright Oct. 2005.*

* cited by examiner

*Primary Examiner*—Doug Hutton
*Assistant Examiner*—Soumya Dasgupta
(74) *Attorney, Agent, or Firm*—Boyle Fredrickson, S.; Peter Stomma

(57) ABSTRACT

The present invention relates to a method and system for transmitting contact information published and/or product/services advertisements of a web page directly to a communication device such as a cellular phone. According to one method, advertisement containing data, voice, image and/or video files is attached to contact information published in a web page and thereafter sent to a one or more communication devices, such as cellular phones, along with the corresponding contact information. Means is provided in the communication device to save and/or display the data, voice, image and/or video files contained in the said advertisement; preferably at such a time when a caller selects or uses the contact information corresponding to the said advertisement. Means is also provided to attach different advertisements at different times to the said contact information.

13 Claims, 6 Drawing Sheets

WEB PAGE TO CELLULAR PHONE—CONTACT INFORMATION MESSAGING SYSTEM

FIELD OF INVENTION

The present invention relates to management of contact information; more specifically to method and means of sending contact information published in a web page directly to one or more communication devices such as cellular phones.

PRIOR ART & BACKGROUND

It is a common practice for businesses to have presence on the internet via a web site. This practice enables businesses to reach out to an ever growing base of customers who do commerce on the internet. It is also a common practice for businesses to publish their contact information on their web pages. The published contact information usually contains business name, phone number, fax number, email and street address. This gives customers the means to contact the said businesses by multiple means including email, phone, fax, mail and in person. It is a common practice in web commerce for customers to look for a product online and then subsequently purchase the said product by another means such as by making a phone call, faxing or mailing an order form or by visiting a retail outlet in person. In order to remember the contact information of a business published on a web page, a customer has to either 1) print the web page containing the said business's contact information; 2) write it manually on a piece of paper or; 3) enter it manually into a communication device such as a cellular phone. This is a cumbersome and time consuming way to remember contact information; especially when a customer has to remember contact information of multiple businesses. There is no invention in the prior art that enables customers to send a contact information published on a web page directly to communication devices such as cellular phones; and thereafter integrate the said contact information into the contact list of the said communication device without requiring the customer to enter the said contact information manually into the communication device.

OBJECTS OF THE INVENTION

Accordingly, the primary objects of the present invention are; 1) to provide means to send contact information published on a web page directly to communication devices such as a cellular phone; and 2) to provide means for the communication device to integrate and save the said contact information into its contact list. Additional objects of the present invention are 1) to provide means to attach advertisements containing data, voice, image and/or video files to contact information published on a web page, and subsequently send the said advertisement along with the corresponding contact information to communication devices such as a cellular phone; and 2) to provide means in the communication device to save and/or display the said advertisement.

SUMMARY OF THE INVENTION

The present invention provides means to send contact information published on a web page directly to communication devices such as a cellular phone. Means are also provided in the communication device to integrate and save the said contact information into its contact list. According to another aspect of the invention, means are provided to attach advertisements containing data, voice, image and/or video files to contact information published on a web page; and thereafter transmit the said advertisement to communication devices such as a cellular phone. Means are provided in the communication device to save and/or display the said advertisement and the corresponding contact information.

DETAILED DESCRIPTION OF THE PRESENT INVENTION & DRAWINGS

Figure 1:
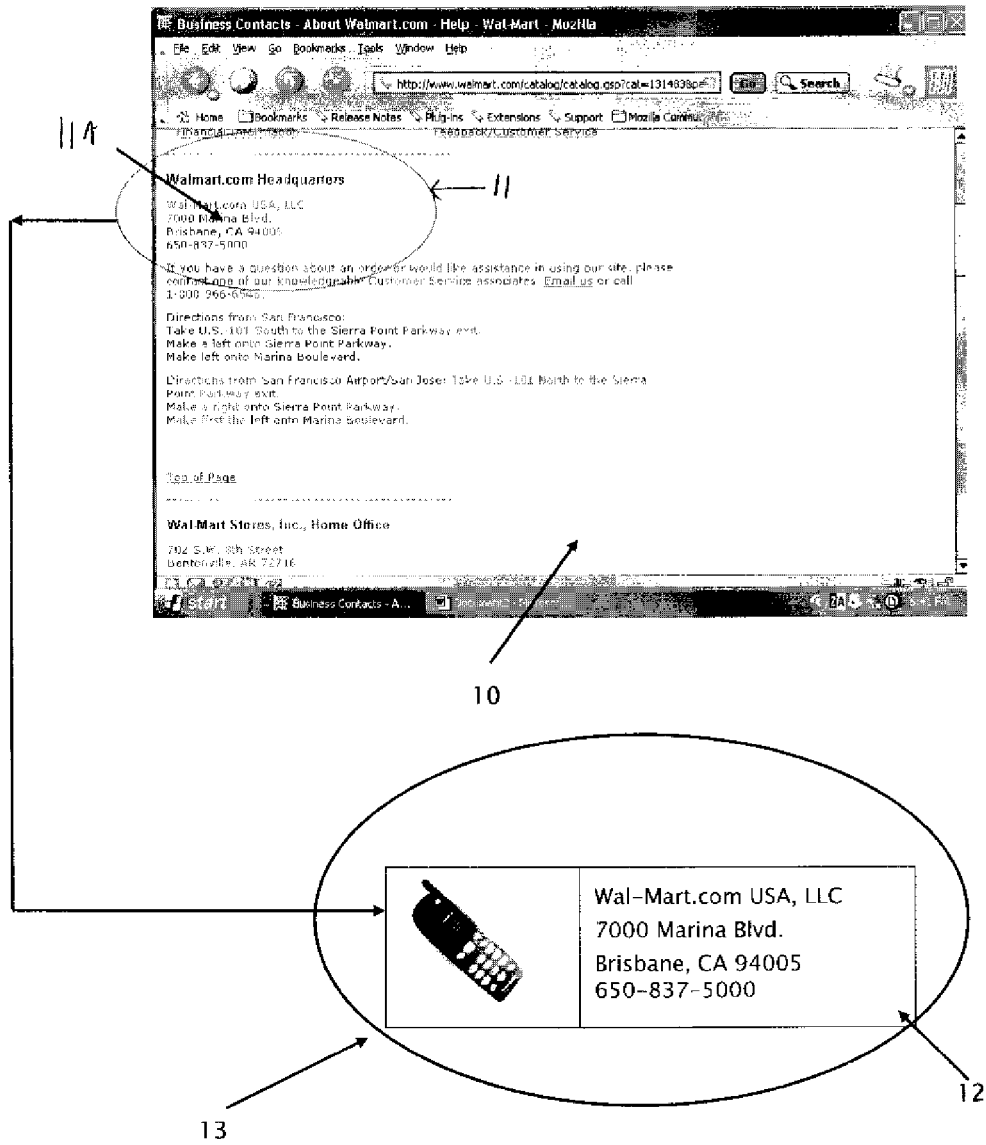
FIG. 1 shows the method of sending contact information (11A) published in a web page (10) using a 'web contact information template' (11) directly to a communication device (cellular phone; 13). It also shows integration of the said contact information (11A) into 'communication device contact information template' (12) of the cellular phone (13).

In this respect; before explaining at least one embodiment of the invention in detail; it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention.

It is a common practice for businesses to publish their contact information on one or more web sites. The purpose of this practice is to enable customers to easily contact them. The published contact information usually contains name, phone number, fax number, email and street address of the business. At the present time, contact information is published on a web page using free text, usually using HTML programming language. There is no standard format for publishing contact information; consequently each web page has its unique format and style for publishing contact information. Presently, customers are required to manually write down the contact information on paper, print the web page containing the contact information or manually enter the contact information into an electronic device if they wish to remember the said contact information for future reference and use.

Figure 2:
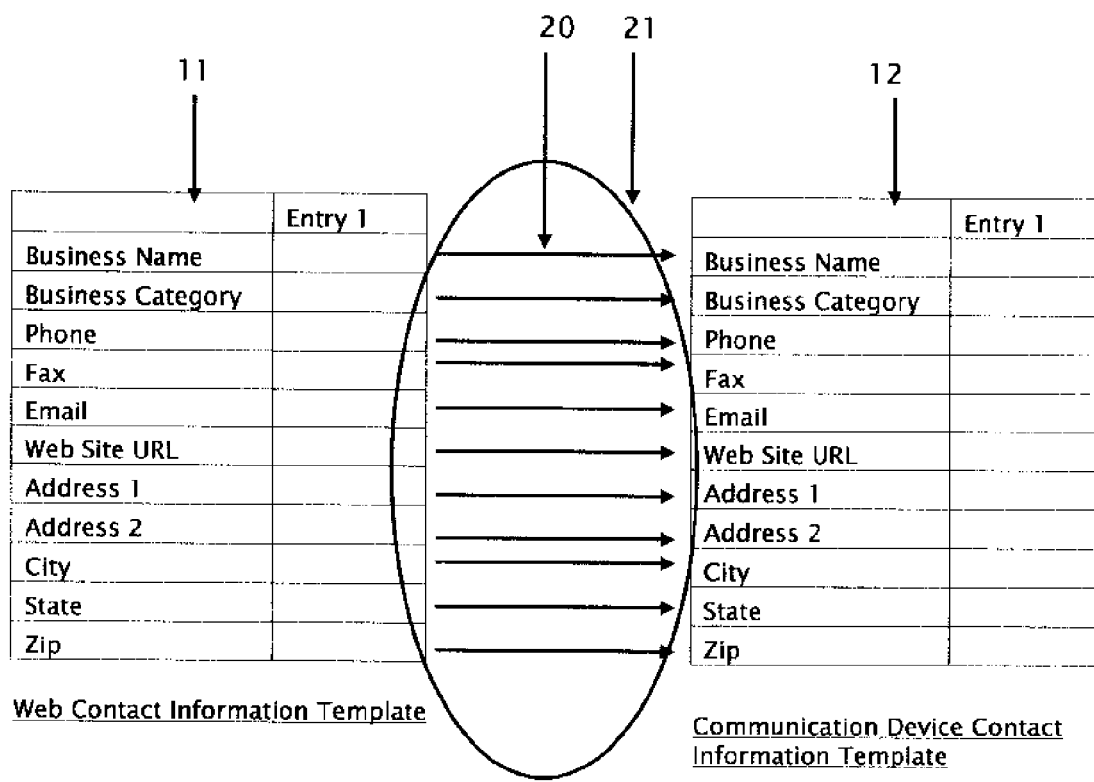
FIG. 2 shows the construction of the 'web contact information template' (11) and the 'communication device contact information template' (12). It also shows an interface (20) published on a central server (21); wherein the interface (20) enables seamless migration of data from the 'web contact information template' (10) to the 'communication device contact information template' (12).

In the preferred embodiment; a standard template, hereby referred to as 'web contact information template' is provided to publish contact information on a web page and is shown in FIG. 2. The 'web contact information template' (11) is preferably programmed using a database program like MS SQL, My SQL; or it can be created using any other suitable program. The type of software used to create the 'web contact information template' should not be considered limiting as more than one software can be used to achieve the same end result. The 'web contact information template' (11) contains data fields for business name, business category, phone number, fax number, email, web page URL and street address. The data fields should not be considered limiting as it can be customized according to individual needs. Means is provided to distribute the 'web contact information template' (11) over the Internet to programmers, web masters and other individuals responsible for designing and programming web pages. Means is provided to integrate the 'web contact information template' (11) into the contact information page of a web page.

A contact information template is also provided for communication devices, such as cellular phones, hereafter referred to as 'communication device contact information template' and is shown in FIG. 2. The said 'communication device contact information template' (12) is created using a software and database program that is suitable for the corresponding communication device. One example of such program is Java 2 Micro Edition (J2ME). Most cellular phones can run Java program with MIDP supported. (MIDP: Mobile Information Device Profile). The newer phones support MIDP2.0 while some older phones only support MIDP1.2/1.1. The type of software program used to create the 'communication device contact information template' (12) should not considered limiting as more than one software program can be used to achieve the desired results. The data fields in the 'communication device contact information template' (11) are similar to the data fields contained in the 'web contact information template' (12). As shown in FIG. 2, the data fields in the 'communication device contact information template' (12) consist of business name, business category, phone number, fax number, email, web page URL and street address. Also shown in FIG. 2 is an interface (20) which is created to enable the 'web contact information template' (11) and the 'communication device contact information template' (13) to talk to each other. This enables a seamless integration of data between the two 'contact information templates' and hence enables seamless migration and integration of contact information data published on a web page into one or more communication devices. In the preferred embodiment of the present invention, the interface (20) is published on a central server (21) which serves as the nodal point for transmission of contact information between a web page and a communication device. Alternatively the interface (20) can also be published in a web page (10) or communication device (13). Means is provided to distribute the 'communication device contact information template' (12) to one or more communication devices over the Internet, wireless network or any other network. Means is provided in the communication device to download, synchronize and integrate data between the corresponding data fields of the 'web contact information template' (11) and the 'communication device contact information template' (12). The 'communication device contact information template' (12) forms the backbone of the contact list of the corresponding communication device.

Figure 3:
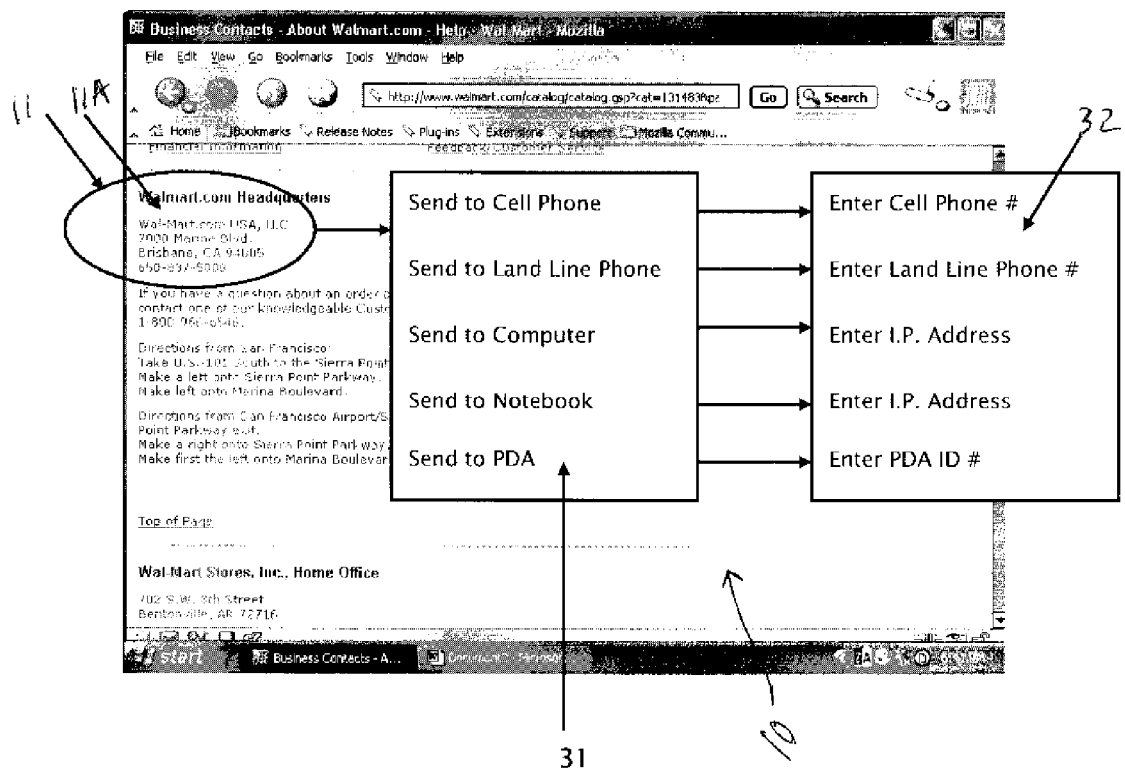
FIG. 3 shows the command prompts (31&32) that are given to a user to enable the said user to send contact information contained in the 'web contact information template' (11) published in a web page to a communication device.

FIGS. 1&3 show the steps involved in sending contact information published on a web page to a communication device. FIG. 1 is a schematic representation of the concept of the present invention. Contact information (11A) is published in a web page (10) using the 'web contact information template' (11). Means is provided to send the contact information (11A) contained in the 'web contact information template' (11) to a communication device such as a cellular phone (13). Means are provided in communication device to integrate the contact information (111A) into the 'communication device contact information template' (12) contained therein. Means is also provided in the communication device (13) to display the said contact information (11A). FIG. 3 shows the steps involved o in sending contact information (11A) published in a web page to a communication device. According to the shown preferred method, when a user right clicks on the 'web contact information template' (11) published in a web page (10), he/she is prompted with a box (31) containing the available choices to send the contact information (11A) contained therein to one or more communication devices. The user is asked for the type of communication device (31) to which the contact information is to be sent. Thereafter the user is asked for the identification information (32) of the said communication device; such as the phone number of a cellular phone. Thereafter, the said contact information (11A) is transmitted to the selected communication device. The said contact information (11A) can be sent to different types of communication devices such as cellular phone, landline phone, fax, PDA, computer and the like. Transmission of the contact information can be done over wireless network or via any other network that supports data send. One such example of data send from computer to other communication devices, such as a cellular phones and pagers, is text messaging; whereby text typed into a template is transmitted to and displayed on a communication device. According to the preferred method of the invention, transmission of data contained in the 'web contact information template' is done on a network which, in addition to data, is also capable of transmitting voice, image and video files. This facilitates transmission of any voice, image or video files that may be attached to contact information (11A).

Means is provided in the communication device to execute meaningful applications based on the contact information contained in the 'communication device contact information template'. One example of such meaningful application is auto dialing of a phone number contained in a contact information. Another example of such meaningful application is to establish connection to a web page URL contained in a contact information without requiring the caller to type the said URL into a web browser on his/her communication device.

In addition to data, means is provided to attach voice, images and video files to the 'web contact information template'. This can be done using existing programming tools and formats such as windows media audio for voice; jpg, gif or tiff for images; and windows media & real for video. The software used to create an advertisement should not be considered limiting as other available software can also be used to create an advertisement. This feature of the invention can be used to advertise products and services of businesses in conjunction with contact information published on web sites. For example, an advertisement comprising of data, voice and/or video files can be attached to contact information in the 'web contact information template' published in a web page. When the said contact information is sent to a communication device, the advertisement attached thereto is also sent. Means is provided in the communication device to save and/or display the said advertisement. The said advertisement is displayed when a caller selects or uses the corresponding contact information; as for example when auto dialing a phone number contained therein.

Figure 4A:
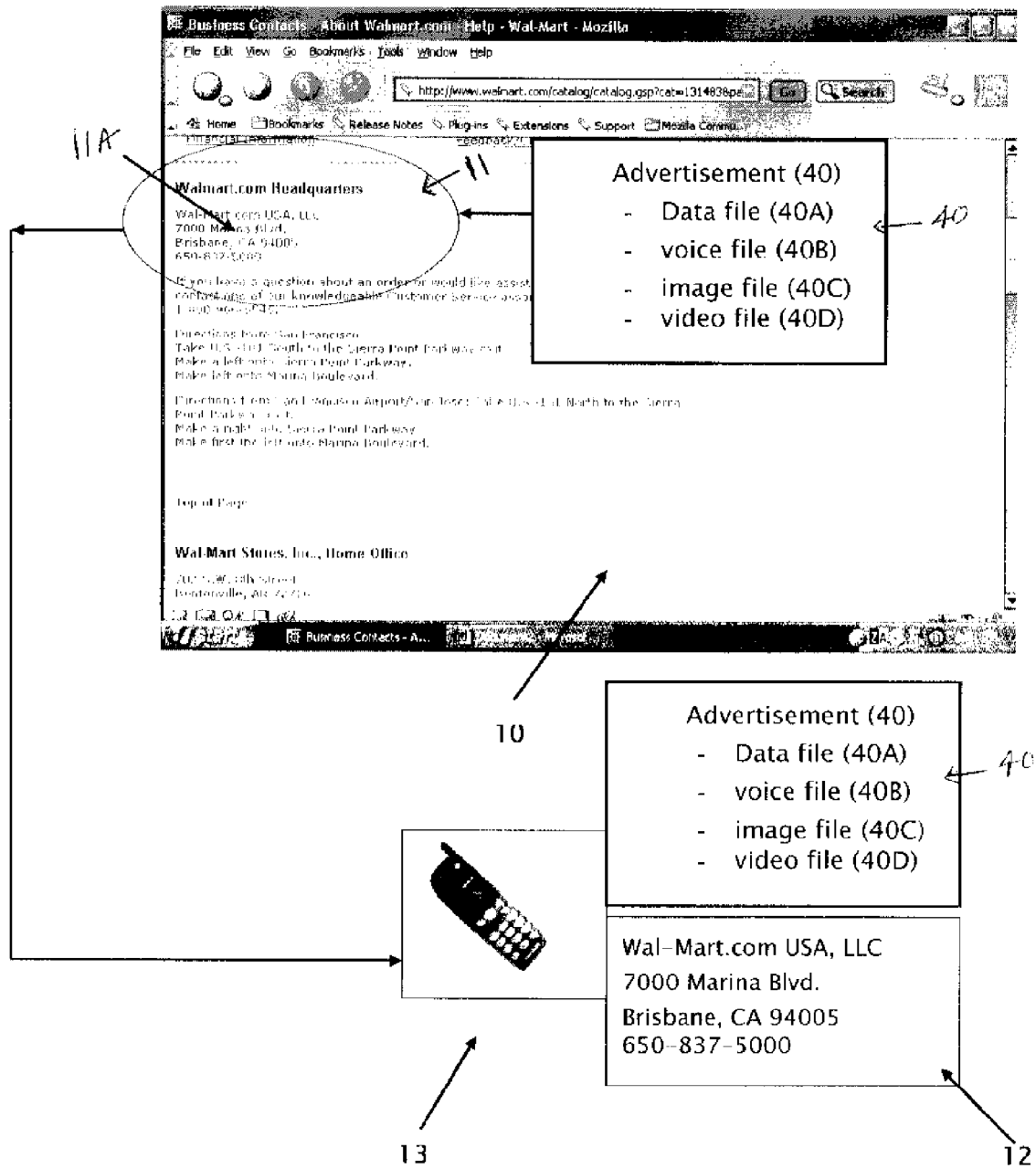
FIG. 4A shows the method and means to attach an advertisement (40) containing data (40A), voice (40B), image (40C) and/or video (40D) files to the contact information (11A) published in a 'web contact information template (11) at the point of publication of the said template in a web page (10); and thereafter sending the said contact information (11A) along with the attached advertisement (40) to a communication device (13). It also shows the display of the said contact information (11A) and the corresponding advertisement (40) on the communication device (13).

According to one method of the invention; advertisement containing data, voice, image and/or video files is attached to contact information published in a web page at the point of publication of the said contact information. The said advertisement is sent to a communication device when the corresponding contact information is. Means is provided in the communication device to save and/or display the said advertisement. The said advertisement is displayed when the caller selects or uses the said contact information such said when auto dialing a phone number contained therein. Means is provided to update advertisements already saved in a communication device as a result. When a contact information with an attached advertisement is transmitted to a communication device, the identity of the said communication device is saved at a central location, such as a server. A new or revised version of the said advertisement is created and sent to all such communication devices where the said contact information has been previously saved. Appropriate software is provided in the communication devices to integrate the new or revised advertisement with the corresponding contact information saved therein. Such software can either be pre loaded into the communication devices or can be sent to communication devices separately, such as when the new or revised advertisement is sent. This feature, for example, can be used to send a new version an advertisement to communication devices having a particular contact information saved in their contact list. An example of this method is shown in FIG. 4A. Contact information of 'Wal-Mart' (11A) is published on its web page (10) using the 'web contact information template' (11). The contact information (11A0 has an advertisement (40) containing data (40A), voice (40B), image (40C) and video (40D) files attached to it. The said advertisement (40) contains brief information about Wal-Mart's promotional offers. When a user sends Wal-Mart's contact information (11A) from Wal-Mart's web page (10) to his communication device such as cellular phone (13), the advertisement (40) attached to Wal-Mart's contact information (11A) is also sent to the said communication device (13). Both, the contact information (11A) and the attached advertisement (40) is integrated and saved in the said communication device. Furthermore, when a caller selects or uses Wal-Mart's contact information (11A); as for example when auto dialing Wal-Mart's phone number on his communication device (13); the attached Wal-Mart's advertisement (40) is displayed on the said communication device (13).

Figure 4B:
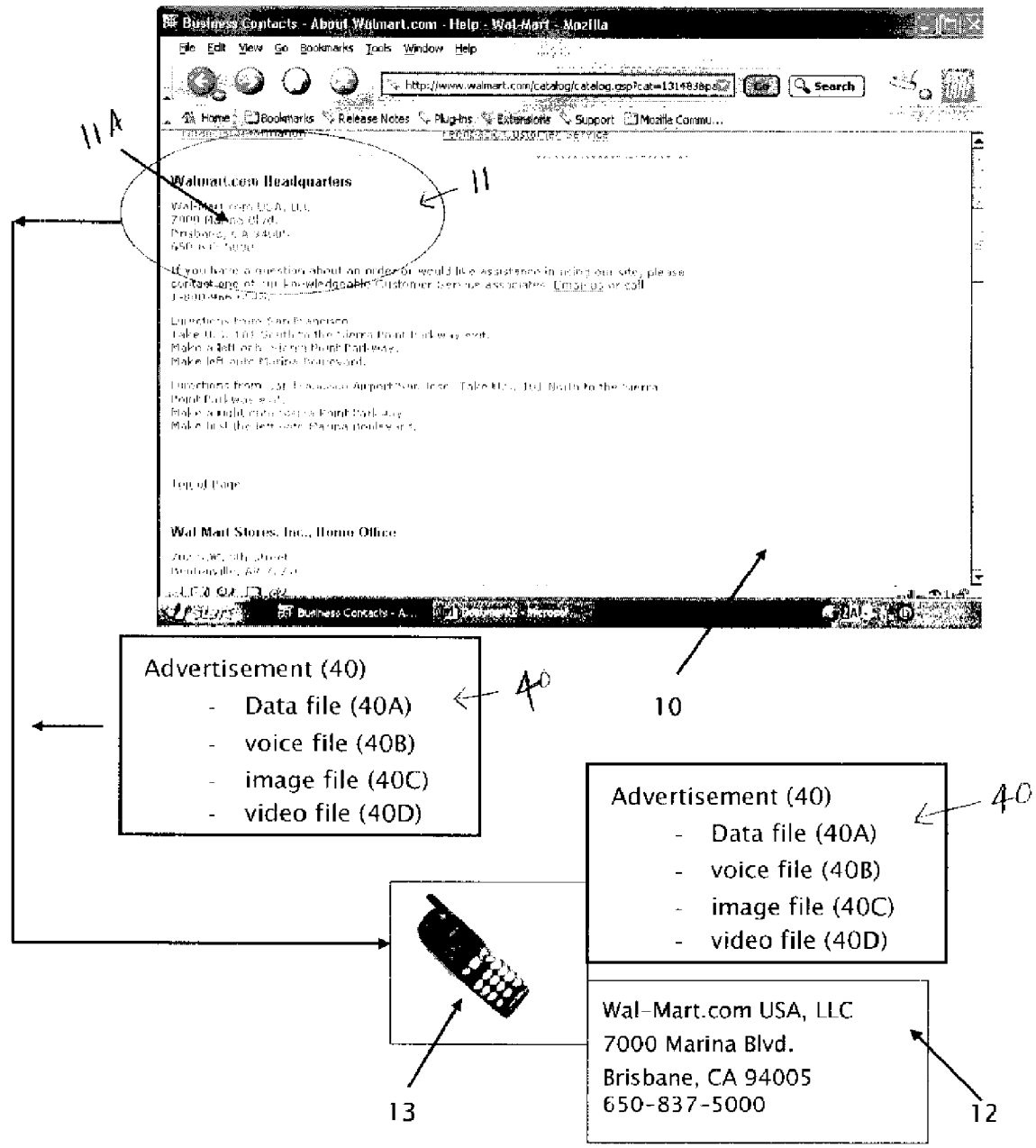
FIG. 4B shows the method and means to attach an advertisement (40) containing data (40A), voice (40B), image (40C) and/or video (40D) files to a contact information (11A) in the 'web contact information template' published in a web page, while the said contact information is in transit to a desired communication device (13). It also shows transmission of the said contact information (11A) along with the attached advertisement (40) to a communication device (13). It also shows the display of the said contact information (11A) and the corresponding advertisement (40) on the communication device (13).

According to another method; advertisement comprising of data, voice, image and/or video files is attached to contact information while the said contact information is in transit to a communication device. This method enables more customization of the advertisement that is sent to a communication device. For example, an advertiser can attach golf advertisements to a contact information in transit to the communication device of a caller who is a golf player; and attach tennis advertisements when the said contact information is in transit to a caller who is a tennis player. An example of this method is shown in FIG. 4B. Contact information of 'Wal-Mart' (11A) is published on its web page (10) using the 'web contact information template' (11). An advertisement (40) containing data (40A), voice (40B), image (40C) and video (40D) files contains brief information about Wal-Mart's promotional offers. When a user sends Wal-Mart's contact information (11A) from Wal-Mart's web page (10) to his communication device such as cellular phone (13), the advertisement (40) is attached to Wal-Mart's contact information (11A) while the said contact information (11A) is in transit to the communication device (13). The advertisement (40) is then sent to the communication device (13) along with the contact information (11A). Both, the contact information (11A) and the attached advertisement (40) is integrated and saved in the said communication device (13). Furthermore, when a caller selects or uses Wal-Mart's contact information (11A); as for example when auto dialing Wal-Mart's phone number; on his communication device (13); the attached Wal-Mart's advertisement (40) is displayed on the communication device (13).

According to yet another method, a package of advertisements comprising of data, voice, image and/or video files are pre loaded or downloaded into the communication devices. Said communication devices are programmed to play selected advertisements when a caller selects/uses selected contact information or selected category of contact information saved in the communication device. Alternatively, an .exe type file can be attached to the contact information contained in the 'web contact information template'; wherein the said .exe type file has means to program a communication device to play select advertisements or category of advertisements saved therein; when a caller selects/uses the said contact information or selected category of contact information. Means is provided to change and update the association between an advertisement and contact information. For example, a package of multiple advertisements containing an advertisement of Dell Computers is pre loaded or downloaded into a communication device. When a caller saves the contact information of Dell Computers in the said communication device, it is programmed to display Dell Computers' advertisement when the contact information of Dell Computers is selected/used by the caller. Alternatively, the communication device can be programmed to display Dell's advertisement when the caller selects a different contact information.

These methods of advertisement of the present invention serve as a powerful means of targeted advertising; as the product and services is advertised to a select and targeted customer base. In the illustrated examples shown in FIGS. 4A&4B, promotional offers (40) of Wal-Mart are advertised only to customers who have willingly saved Wal-Mart's contact information (11A) in their communication devices (13). Additionally; promotional offers (40) at Wal-Mart is advertised to the said customer at the time when he/she is selects/uses the contact information of Wal-Mart (11A); such as when auto dialing a phone number contained therein. These features combined, in inventor's opinion, will result in a significantly higher sales and revenue for businesses.

Figure 5:
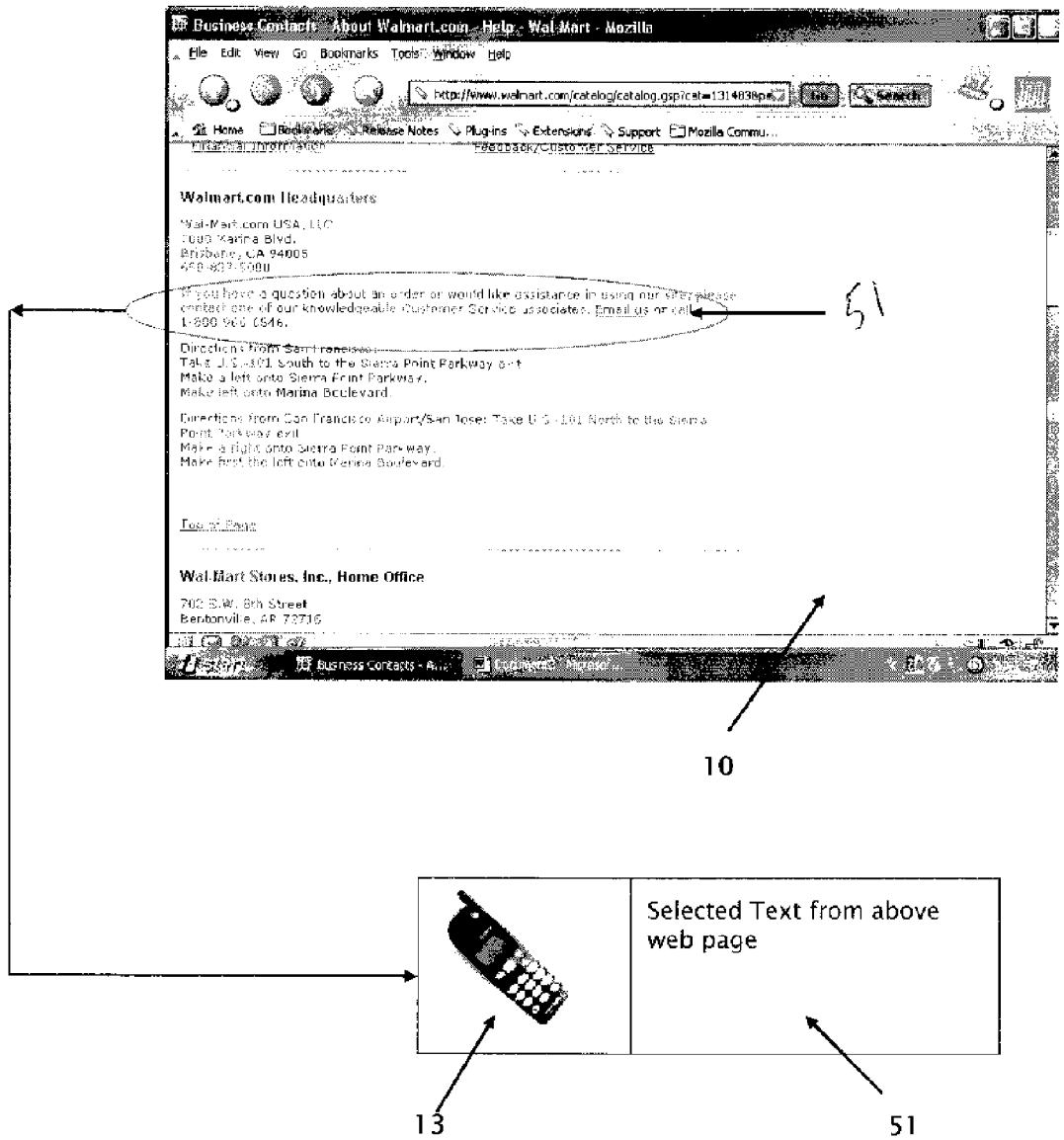
FIG. 5 shows a method to transmit information published on a web page to remote communication device.

The invention is capable of other embodiments and of being practiced and carried out in various ways. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention. Some variations of the present inventions are: 1) Although the present invention relates to transmission of contact information from a web page to communication devices; contact information from other sources like MS Outlook, Palm address book and the like can also be sent to one or more communication devices. 2) The present invention relates to methods and means of sending contact information published in a web page to communication devices. However, contact information published on a web page can also be sent to contact management programs such as MS Outlook. 3) In addition to contact information, other types of information can be sent to communication devices similarly. For example, means and methods of the present invention can be used to send data, image, voice and video files published on a web page to one or more communication devices. As shown in FIG. 5; data (51) published on a web page (10) can be sent to a communication device (13) using the principles of the invention. 4) Based on the recitals of the present invention, the means and method described can be used to send data, voice, image and video published in an offline source, such as MS Word, to one or more communication devices. In the above mentioned variations of the present invention, preferably means are provided to save, archive and organize the said files in the communication device. Preferably, a reader and a viewer program are provided to enable optimal display of the contents of the said files in communication devices.

What is claimed is:

1. A method for storing contact information displayed on a webpage to a mobile communication device having a memory for storing contact information, comprising:
    determining entries for various fields of a webpage contact information template associated with a selected enterprise;
    determining contact information for the selected enterprise from the various fields of the webpage contact information template for the selected enterprise;
    determining a specific mobile communication device the contact information is to be transmitted and stored to; and
    transmitting, from a database remote from the specific mobile communication device, contact information to the specific mobile communication device, wherein the contact information is arranged in the database according to the webpage contact information template that is representative of a number of data fields, wherein each data field includes a separate, portion of the contact information; and
    automatically storing the contact information for the selected enterprise in the memory of the specific mobile communication device, which includes populating a database in the memory of the specific mobile communication device according to a communication device contact information template; that is representative of a number of data fields of the database remote from the specific mobile communication device with each data field configured to contain a separate portion of the contact information, and wherein the communication device contact information template is matched to the webpage contact information template, such that entries from the webpage contact information template for the enterprise are populated in corresponding data fields for the communication device contact information template.

2. The method of claim 1 wherein determining the specific mobile communication device includes prompting the user to identify a unique identifier for the identified mobile communication device.

3. The method of claim 2 wherein the unique identifier includes a telephone number associated with the mobile communication device.

4. The method of claim 1 further comprising transmitting advertisement information together with the contact information for the enterprise to the specific mobile communication device.

5. The method of claim 4 wherein the advertisement information is a data file.

6. The method of claim 4 wherein the advertisement information is a voice file.

7. The method of claim 4 wherein the advertisement information is an image file.

8. The method of claim 4 wherein the advertisement is a video file.

9. The method of claim 1 wherein the specific mobile communication device is one of a mobile telephone, a personal data assistant, and a computer.

10. A method for storing contact information displayed on a webpage to a mobile communication device having a memory for storing contact information, comprising:
    determining contact information for a selected enterprise by determining entries for various fields of a webpage contact information template associated with the selected enterprise;
    determining a specific mobile communication device the contact information is to be transmitted and stored to;
    pairing an advertisement with the contact information for the selected enterprise; transmitting the contact information and the advertisement for the selected enterprise to the specific mobile communication device and storing the contact information in the memory of the specific mobile communication device, which includes populating a communication device contact information template matched to the webpage contact information template with entries from the webpage contact information template for the enterprise, wherein the transmitted contact information is first retrieved from a remote database having a number of data fields, wherein each data field includes a separate portion of the contact information for the selected enterprise and wherein the memory of the mobile communication device includes a database having data fields corresponding to the data fields of the remote database such that entries in the remote database are stored in data fields that correspond to the data fields of the database stored in memory of the mobile communication device; and
    displaying the advertisement on the mobile communication device.

11. The method of claim 10 wherein the mobile communication device has a contact list and wherein the advertisement and the contact information for the selected enterprise is stored in memory of the mobile communication device such that in the contact list of the mobile communication device is populated with the contact information and the advertisement.

12. The method of claim 10 further comprising accessing the advertisement for the selected enterprise from a database that is remote from a database containing the contact information for the selected enterprise.

13. The method of claim 10 wherein the advertisement includes at least one of textual, graphical, voice, or video data.

* * * * *